V. J. ODHNER.
SUPPORTING MEANS OF THE TEN-PIN, HUNDRED-PIN, &c., OF THE CALCULATING WHEELS IN CALCULATING MACHINES.
APPLICATION FILED FEB. 18, 1920.
1,388,746. Patented Aug. 23, 1921.
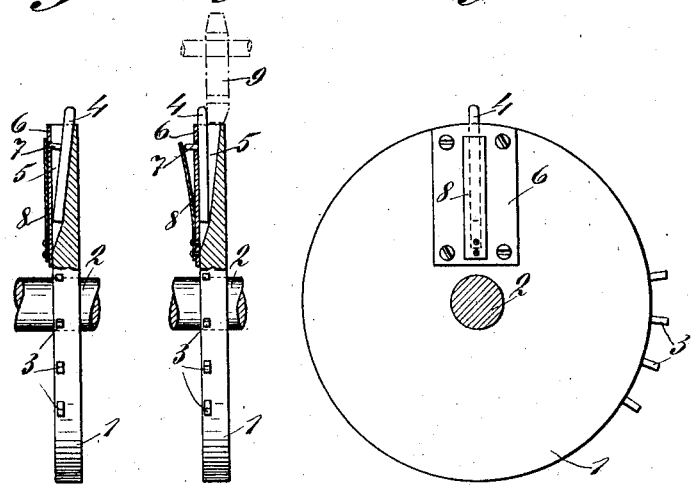
Inventor
V. J. Odhner,
By H. R. Kerslake
Attorney

UNITED STATES PATENT OFFICE.

VALENTIN JAKOB ODHNER, OF TURISTHOTELLET, HINDÅS, SWEDEN.

SUPPORTING MEANS OF THE TEN-PIN, HUNDRED-PIN, &c., OF THE CALCULATING-WHEELS IN CALCULATING-MACHINES.

1,388,746.          Specification of Letters Patent.     Patented Aug. 23, 1921.

Application filed February 18, 1920. Serial No. 359,628.

*To all whom it may concern:*

Be it known that I, VALENTIN JAKOB ODHNER, a subject of the King of Sweden, and resident of Turisthotellet, Hindås, in the Kingdom of Sweden, have invented certain new and useful Improvements in or Relating to Supporting Means of the Ten-Pin, Hundred-Pin, &c., of the Calculating-Wheels in Calculating-Machines, of which the following is a specification, reference being had therein to the accompanying drawing.

In ordinary calculating machines of the kind disclosed in my prior Patent 1,348,576, August 3, 1920, provided with calculating wheels, besides the shiftable pins for rotating the registering wheels and the numeral disks step by step, laterally swingable ten-pins, hundred-pins, etc., are provided, which serve to transmit the tens, etc., to the numeral disk of the next higher value. Hitherto the said ten-pin, etc., has been swingable on a pivot and located in a groove provided in the calculating disk. If the ten-pin has not a central position in the said groove but bears against one of its sides, which may happen, if the said pivot originally has an oblique position or has been bent in any manner, it may happen that the spring, adapted to return the pin to its normal position, is not able to move the pin to the said position, but the pin remains in its active position, into which it has been brought by the ordinary ten transmitting arm, which results in miscalculation. The object of this invention is to remove the said disadvantage, which is effected by loosely mounting the pin in the groove of the calculating wheel and so arranging the device, that the pin is supported laterally at the bottom of the groove acted upon by the necessary return spring.

In the accompanying drawing Figures 1 and 2 show in edge views and partially in vertical sections a calculating wheel provided with a ten pin arranged in accordance with the invention. Fig. 1 shows the said pin in normal position and Fig. 2 shows the pin in active position. Fig. 3 is a side view of the calculating wheel.

1 is the calculating wheel fixed on the shaft 2 and provided with the ordinary shiftable pins 3. Four pins are shown in projecting, active position. 4 designates the ten-pin. The wheel 1 may be provided with two ten-pins, but only one is shown in the drawing. According to this invention the pin 4 is loosely mounted in a radial groove 5 in the wheel 1, which groove is covered by a plate 6 fixed to the wheel. A dent or projection 7 on the pin 4 extends through an opening provided in the plate 6 and outside the latter a spring 8 is provided, which actuates the said dent and returns the pin into its inactive or normal position, shown in Fig. 1. The bottom wall or rear side of the groove 5 preferably has a slanting position, as shown, so that the pin 4 rests upon the same, while it is in its normal position. The lower end of the pin 4 bears laterally against the rear walls of the groove and the dent 7 prevents the pin from being moved radially.

The pin 4 is shifted from the position shown in Fig. 1 to the active position shown in Fig. 2 in the ordinary manner by the ten transmitting arm 9, shown by dotted lines in Fig. 2. During the shifting operation the pin is guided by the side walls of the groove 5 and pushes aside the spring 8, which, after the pin has passed the arm 9 and has transmitted the tens to the next numeral disk, returns the pin to its normal position, Fig. 1. As seen from the drawing the pin is able to move freely in the groove 5, guided by its side walls. Thus, the pin can not occupy any oblique position transversally of the groove and, consequently, may not be jammed. For that reason the pin always operates properly and can not cause any miscalculation.

The invention may evidently be modified in some respect or other without exceeding the limits of the same.

Having now described my invention, what I claim as new and desire to secure by Letters Patent is:

1. In calculating machines, the combination with a calculating wheel provided with a groove, of a pin loosely mounted in said groove and movable in a plane extending radially of the wheel, and resilient means operatively connected to said pin for normally holding the same in predetermined position.

2. In calculating machines the combination with the calculating wheels respectively and a groove provided in the same of a ten-pin or hundred pin, etc., loosely mounted in the said groove, at the bottom of which it is supported laterally, a projection provided on the said pin and extending through an opening in the one side wall of the groove, and a return spring acting upon the said projection.

3. In a calculating machine, the combination with a calculating wheel provided with a radially disposed groove having an inclined bottom surface, of a pin mounted in said groove to oscillate in a plane extending radially of the wheel, and a spring operatively connected with said pin for normally holding the same in engagement with the inclined surface of the groove.

In witness whereof, I have hereunto signed my name.

VALENTIN JAKOB ODHNER.